Nov. 18, 1941.  H. T. SPARROW  2,263,017
MEASURING AND CONTROL APPARATUS
Filed March 31, 1937   3 Sheets-Sheet 1
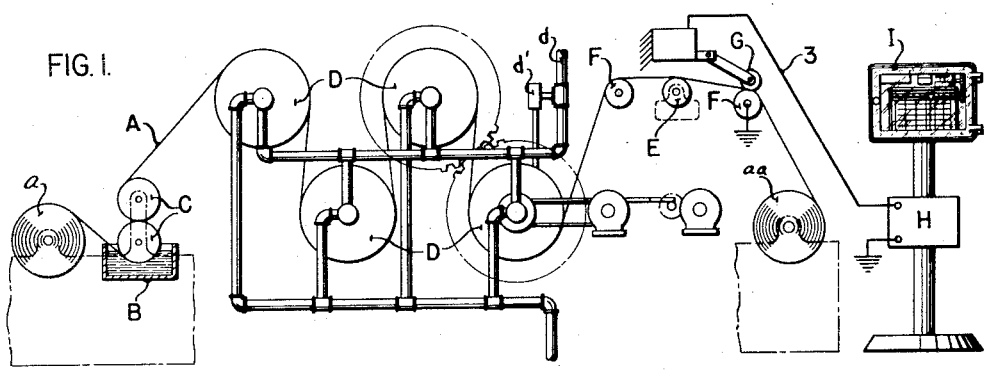
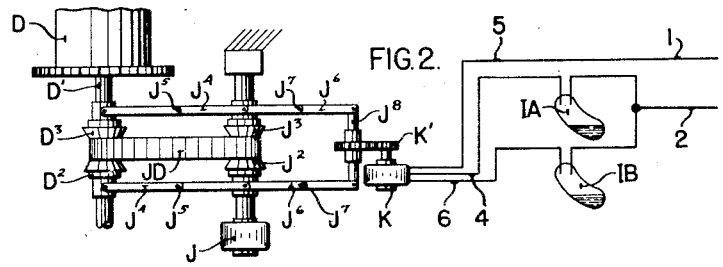
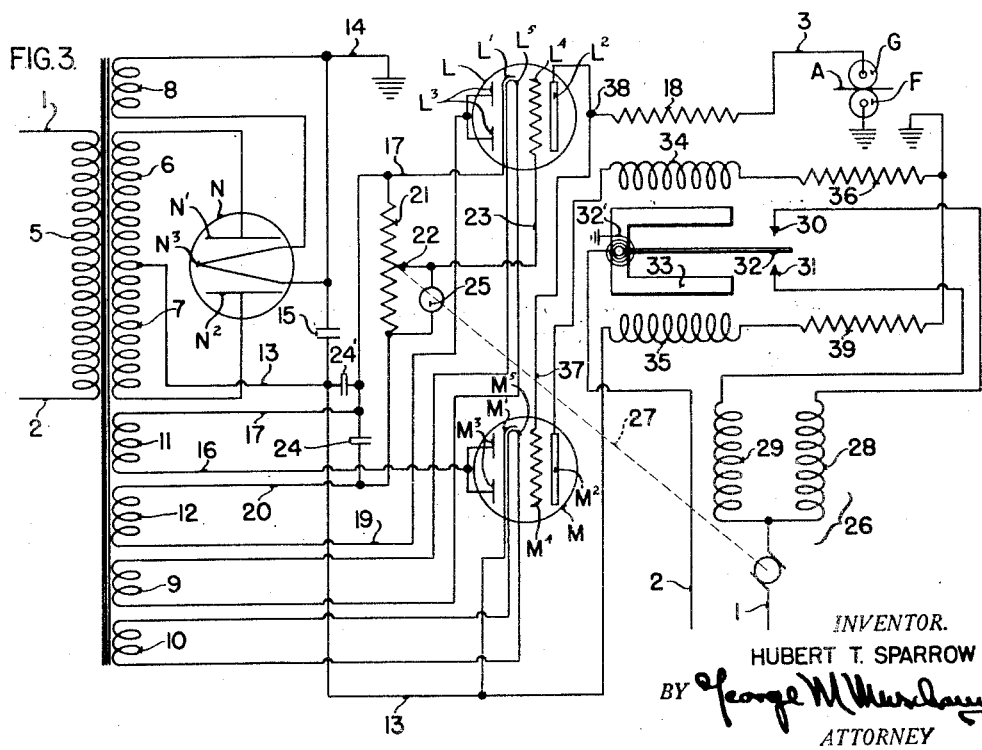
INVENTOR.
HUBERT T. SPARROW
BY George M. Murchamp
ATTORNEY

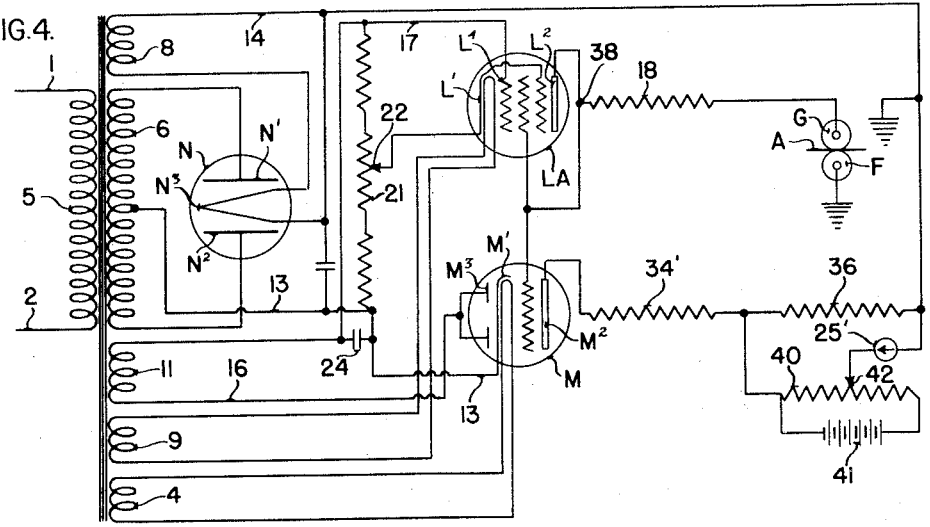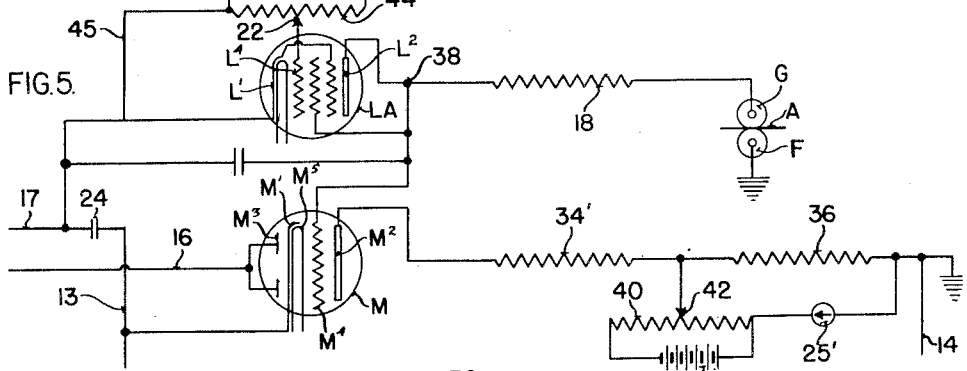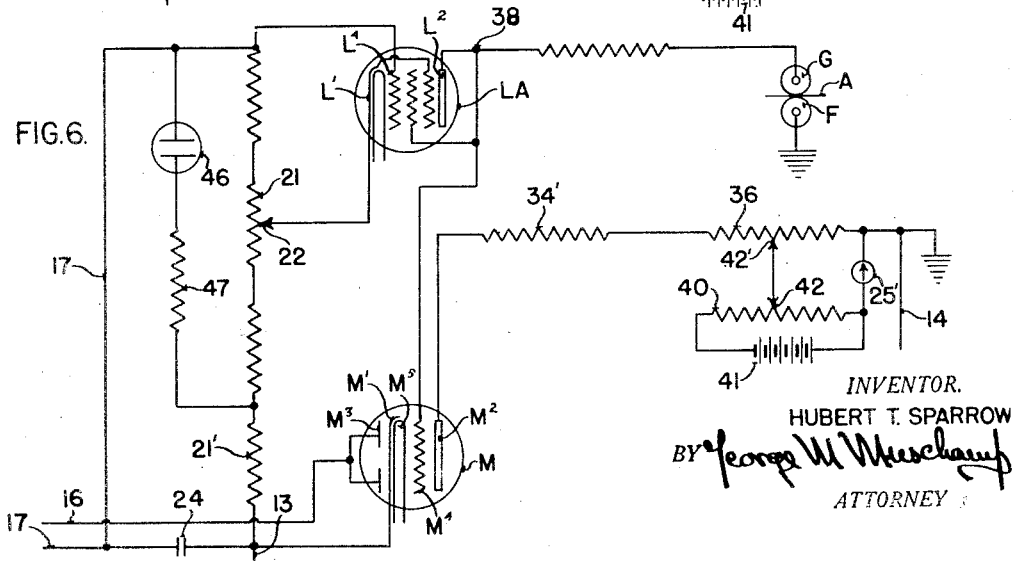

Nov. 18, 1941.  H. T. SPARROW  2,263,017
MEASURING AND CONTROL APPARATUS
Filed March 31, 1937  3 Sheets-Sheet 3
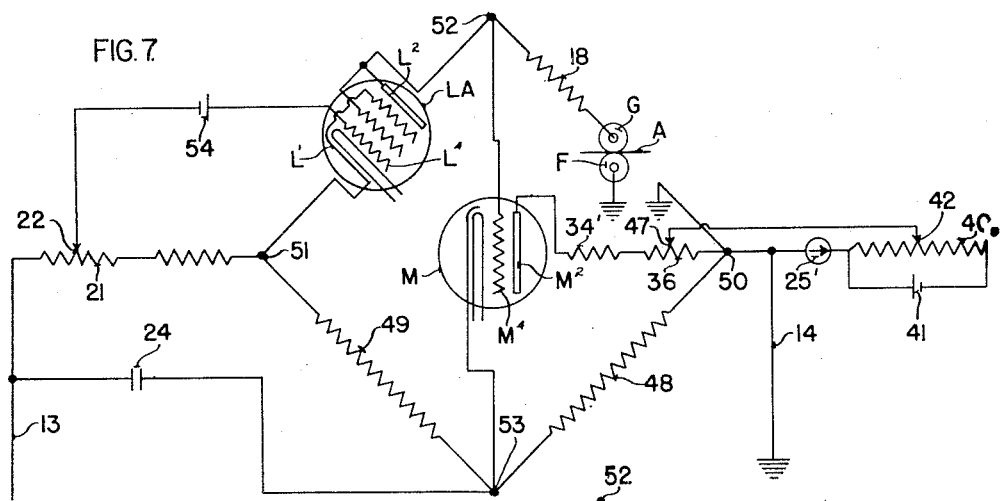
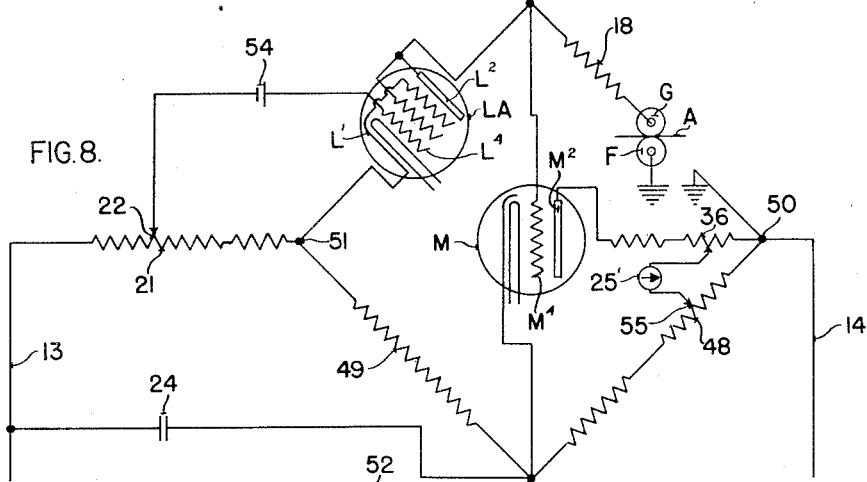
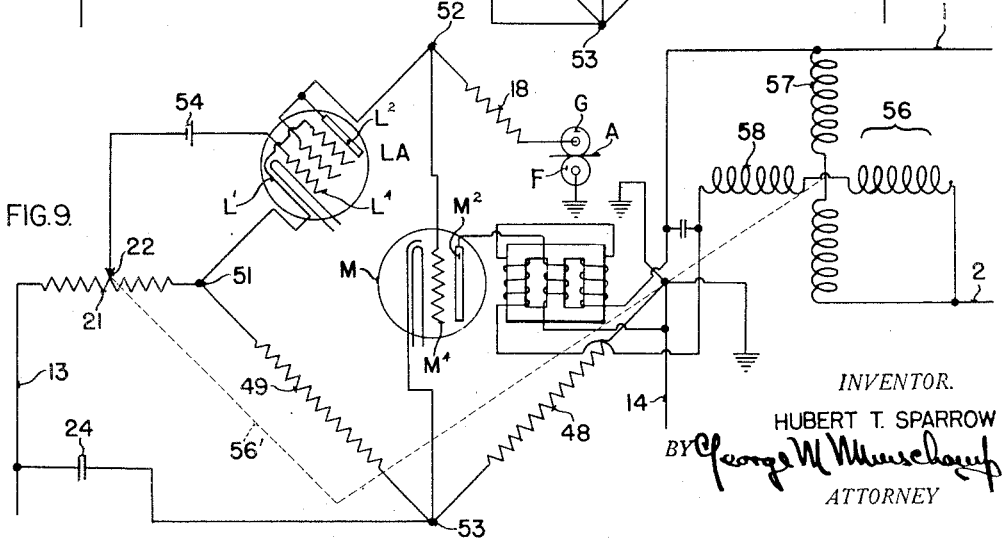
INVENTOR.
HUBERT T. SPARROW
BY George W. Muschamp
ATTORNEY Patented Nov. 18, 1941

2,263,017

UNITED STATES PATENT OFFICE 2,263,017

MEASURING AND CONTROL APPARATUS

Hubert T. Sparrow, Minneapolis, Minn., assignor to The Brown Instrument Company, Philadelphia, Pa., a corporation of Pennsylvania Application March 31, 1937, Serial No. 134,093

19 Claims. (Cl. 175—183)

The present invention comprises improvements in methods of and apparatus for making electrical measurements, and, particularly, measurements of the electric conductivity of materials. More specifically, the object of the invention is to provide simple and efficient methods and apparatus particularly adapted for use in measuring the electrical conductivity of materials or bodies of high resistance.

A special object of the invention is to provide an improved method of and apparatus for indirectly measuring the moisture content of solid bodies such as textile, paper, and other sheets or webs, by directly measuring the resistance of such sheets or webs and the invention comprises features especially devised and adapted for use in measuring the resistance of a moving web of material to thereby determine the moisture content of the web. Such measurements are particularly important in the paper making and textile arts, and by way of example, I have illustrated, and hereinafter described in detail, apparatus embodiments of the present invention adapted for use in measuring the moisture content of a traveling web of warp yarn, at the end of a sizing operation to which the yarn is subjected preparatory to its use in a weaving loom. In the manufacture of woven fabrics by high speed weaving methods, it has been found necessary to increase the strength of the warp, or to increase its resistance to the friction or chafing to which it is subjected in the weaving operation, by subjecting the yarn to a sizing or so-called "slashing" treatment.

That treatment consists in the application to the yarn of a solution composed of suitable ingredients forming a protective coating on the yarn and its fibrous constituents, and softening the threads to make them sufficiently pliable to bend about the filling threads in the woven goods.

In the slashing operation, it has been found that the best results are obtained when the sizing is applied to the warp after the latter has been wound on a warp beam, and while it is being unwound from the warp beam and wound up on a loom beam in the final step of preparing the warp for insertion in the loom. In thus slashing or sizing warp yarn, it is desirable that the sized warp yarn, when wound on the loom beam should be at a suitably low temperature, and should have a moisture content within a small range of permissible variation, and much smaller than the moisture content of the yarn as it passes away from the sizing bath. To reduce the moisture content of the yarn as it passes away from the sizing bath, the yarn is moved over steam heated drying drums or rolls, and is then cooled by passing it over a cooling roll.

The proper operation of the slashing machine is greatly facilitated by an accurate measurement of the moisture content in the web as it passes from the slasher proper, to the loom beam on which it is wound, because said moisture content should be closely controlled, and is dependent on various variables, including, in particular, the viscosity of the size which depends on the size temperature as well as its composition, on the operating effect of the squeeze rolls of the slasher on the physical characteristics of the yarn, and on the temperature of the drying rolls. That the range of variation in the moisture content of the warp should be narrow is practically essential, because a certain small moisture content in the yarn is desirable to permit evaporative cooling of the yarn and resultant dissipation of frequency heat in the weaving operation, while a moisture content, but little greater than that required for the desired evaporative cooling action may result in the mildewing or discoloration of the fabric produced, and is otherwise objectionable in the weaving operation.

In determining the moisture content of the sized yarn by measuring the electric conductivity of the yarn, I avoid difficulties inherent in methods heretofore employed or proposed for use in making moisture content measurements.

The determination of the moisture content of a sized web, or analogous body, by measuring an electrical quantity dependent on the current flow through the web, presents problems because of certain special conditions including the wide variation, from practically nothing up to 1000 megohms or so, in the web resistance included in the measuring circuit, the necessarily minute character of the maximum possible current flow through the web, and the fact that the relation between web moisture content and web conductivity is not linear but logarithmic.

The present invention was devised, and is adapted to cope successfully with the above mentioned special conditions. In the practice of the present invention, I include the web resistance to be measured in the plate circuit of a thermionic tube, and on changes in the web resistances, I vary the plate to cathode resistance of said tube as required to maintain a predetermined pressure drop in a portion of the plate circuit which includes the web resistance. I have discovered that when the web resistance is included in such a plate circuit and the latter has suitably chosen constants, the plate to cathode resistance variations required to measure the varying web moisture, may be effected by adjustments of the tube grid bias potential, which are substantially in linear proportion to the changes in web moisture content giving rise to the changes in web resistance. The utilization of said discovery in accordance with the present invention, adds materially to the practical merit of the latter.

In the preferred mode of carrying out the present invention, the grid potential bias of the above mentioned thermionic tube is automatically adjusted by means responsive to variations in the plate current of a second thermionic tube which has its grid bias potential, and thereby its plate current, controlled by the connection of the control grid of the second mentioned tube to the plate circuit of the first mentioned tube at a control point therein at which the potential is jointly dependent in a predetermined manner on the web resistance and on the plate to cathode resistance of the first mentioned tube.

My present invention comprises various special measuring circuit features, including provisions in some forms of the invention for compensating for voltage variations in the thermionic tube energizing source of current, which are especially important when that source of a current is a power unit including a rectifier energized by an ordinary commercial source of alternating current, the voltage of which can be expected to fluctuate through a considerable range.

The various features of novelty which characterize my invention are set forth in the appended claims. For a better understanding of the invention, however, and its advantages, and specific objects attained with its use, reference should be had to the accompanying drawings and descriptive matter in which I have illustrated and described preferred embodiments of my invention.

Of the drawings:

Fig. 1 is a diagrammatic representation of a warp sizing or "slasher" machine, and means associated therewith in accordance with the present invention for measuring the moisture content of the yarn after it has passed over the drying and cooling rolls of the slasher;

Fig. 2 is a view, partly plan and partly diagrammatic, illustrating means for automatically varying the speed of the slasher drying drums to thereby vary their web drying action;

Fig. 3 is a diagrammatic representation of a measuring circuit arrangement constituting one embodiment of the present invention;

Fig. 4 is a diagram illustrating a modification of the circuit arrangement shown in Fig. 3;

Fig. 5 is a diagram illustrating a further modification of the apparatus shown in Fig. 3;

Fig. 6 is a diagram illustrating a modification of the circuit arrangement of Fig. 4 which includes means for compensating for line voltage fluctuations;

Fig. 7 is a diagram illustrating a modification of the arrangement of Fig. 4, which includes a voltage divider supplying suitable voltages to different electronic circuit portions;

Fig. 8 is a diagram illustrating a desirable modification of the arrangement shown in Fig. 7; and Fig. 9 is a diagram illustrating a modification of the arrangement shown in Fig. 7, which includes a reversible electric motor for adjusting the measuring contact, and includes a choke coil associated with the plate circuit of a thermionic tube for controlling the operation of said motor.

In Fig. 1, I have illustrated the use of my invention in measuring the electric conductivity of a web of sized warp yarn, as it leaves a sizing machine, or "slasher," of conventional type. In the slasher shown in Fig. 1, the warp A is unwound from a warp beam a, and is passed from the latter through a sizing bath in a sizing pan B, over so-called squeeze rolls C to drying drums D, from whence the yarn passes over guide rolls F, and a cooling drum E back of the final guide roll F', onto a loom beam aa. The drying rolls D are heated by steam supplied through a pipe d at a rate regulated by a control valve d' which may automatically regulate the steam supplied as required to maintain a predetermined steam pressure in the drums D. The moisture content of the warp yarn as it passes from the slasher proper to the warp beam aa, is measured by measuring the electrical conductivity of the warp yarn as it passes over the final guide roll F of the slasher.

To measure the electrical conductivity of the warp passing over the final guide roll F, I employ an electrode or contact in the form of a roller G which is held in contact with the warp passing between it and the final guide roll F, by a suitable bias force, due, as shown, partly to gravity and partly to spring action. The final guide roll F is connected to ground, in ordinary practice as a result of the grounding of the slasher frame in which the guide roll is journalled.

The roller G is connected by a conductor 3 to one terminal of the device H, which also has at least one other terminal connected to ground, and which includes means for amplifying an effect due to variations in an electric current which is passed through the portion of the web between the contact roller G and adjacent guide roller F, and providing a measure of the conductivity and thereby of the moisture content of the web.

The device H provides a measurable electrical quantity which is a function of the web moisture content, and advantageously is measured by an electrical measuring, or measuring and control, instrument I of suitable available type. The type of instrument I available for use with any particular measuring circuit or system which I may employ, is dependent upon the character of said circuit or system. Thus the arrangement shown in Fig. 3 includes a special control element separate from the instrument I, and the latter is advantageously a simple recording voltmeter. In the arrangements shown in Figs. 4-8, however, the measuring instrument may well be a pyrometric control instrument, such as the commercial "Brown potentiometer" controller, one form of which is disclosed in the Harrison Patent 1,946,280, granted Feb. 6, 1934. When the instrument I is a control instrument, it may include provisions for automatically adjusting the operation of the slasher, as required to maintain the moisture content of the warp in engagement with the contact roll G at an approximately constant predetermined value, or the measurements furnished by the instrument I may be utilized in the manual control of the slasher operation.

In Fig. 2, I have illustrated one form of means for controlling the moisture content in the warp leaving the slasher, by automatically varying the speed of travel through the slasher of the web A. In the type of slasher collectively illustrated in Figs. 1 and 2, the various rolls or drums D are geared together and the shaft D' of the final drum D is driven by a constant speed motor J, through a variable speed drive of the well known Reeves type, comprising axially adjustable cone pulleys $D^2$ and $D^3$ on the shaft D', and $J^2$ and $J^3$ on the shaft J' of the motor J, and a connecting belt JD. The pulleys $D^2$ and $J^2$ are connected by a lever $J^4$ having a fulcrum $J^5$ between the shafts J' and D', and the pulleys $D^3$ and $J^3$ are similarly connected by a second lever $J^4$. Each of the pulleys $J^2$ and $J^3$ is connected to one end of a corresponding lever $J^6$, pivoted at $J^7$, intermediate its ends. The ends of the two levers $J^6$, remote from the shaft J' are connected by a turn buckle $J^8$, carrying a spur gear in mesh with and rotated by a gear K' carried by the armature shaft of a reversible control motor K. The motor K, as shown, is energized from supply conductors 1 and 2, for operation in one direction or the other by the closure of one or the other of two control switches IA and IB.

In operation, when the moisture content of the warp yarn engaging the contact roll G is greater than is desirable, the switch IA is closed, and the motor K then operates in the direction to increase the distance between the pulleys $J^2$ and $J^3$, and correspondingly reduce the distance between the pulleys $D^2$ and $D^3$, and thereby reduce the speed of the drying rolls D. This increases the time period during which the web is in contact with the drying rolls D, and thus increases the web drying effects of the rolls, so that the moisture content of the warp leaving the rolls is decreased. Conversely, when the moisture content of the warp engaging the contact roller G is less than is desirable, the switch IB is closed, and the motor K is operated in the direction to move the pulleys $J^2$ and $J^3$ closer together and to spread the pulleys $D^2$ and $D^3$ farther apart, and thus increases the speed and reduces the web drying effect of the rolls D, so that the moisture content of the web passing the contact roller G is increased.

As shown, the energizing circuit for the motor K, established when the switch IA is closed, includes supply conductor 2, switch IA, terminal conductor 4 for one winding of the motor K, terminal conductor 5, and supply conductor 1. When the switch IB is closed, the motor is energized through a circuit including the supply conductor 2, switch IB, terminal conductor 6 for a second winding of the motor K, the common terminal conductor 5, and supply conductor 1.

The switches IA and IB may be included in and automatically actuated by the instrument I, on warp moisture variations generally as control switches are included in and actuated by the control mechanism of the above mentioned Patent 1,946,280. Inasmuch, however, as instruments automatically adjusting control switches in response to variations in a measured control quantity are well known, and the details of the means for controlling the adjustment of switches IA and IB form no part of the present invention, further reference to such details is unnecessary herein.

One arrangement of circuit and apparatus features of the device H, is illustrated in Fig. 3. The apparatus shown in Fig. 3 includes two thermionic tubes or valves L and M, each of which is a duplex-diode triode. The tube L comprises a cathode L', a plate or anode $L^2$, diode plates $L^3$, a control grid $L^4$ interposed between the cathode L' and plate $L^2$, and a tube heating filament $L^5$, and the valve M comprises corresponding parts M', $M^2$, $M^3$, $M^4$, and $M^5$.

The apparatus shown in Fig. 3 also comprises an alternating current transformer having a primary winding 5 with its terminals connected to supply conductors 1 and 2, and having secondary windings 6, 7, 8, 9, 10, 11, and 12. One terminal of each of the secondaries 6 and 7 is connected to a conductor 13 which constitutes the negative side or negative output conductor, of a rectifier unit including a full wave rectifier tube N, having its two plates N' and $N^2$ connected to the second terminals of the secondaries 6 and 7, respectively. The filament $N^3$ of the rectifier tube N is connected to, and energized by, the transformer secondary 8, and a conductor 14 connecting one end of the filament $N^3$ to ground, constitutes the positive side, or positive output conductor, of the rectifier unit. To smooth out the rectified current, a condenser 15 is connected between the rectifier output conductors 13 and 14. The transformer secondary 9 is connected to and heats the filament $L^5$ of the valve L, and the transformer secondary 10 is connected to and heats the filament $M^5$ of the valve M.

The transformer secondary 11 has one terminal connected by a conductor 16 to the diode plates $M^3$ of the valve M, and has its other terminal connected to one terminal of a condenser $24^1$ by a conductor 17 which constitutes the negative side of a half wave rectifier unit including the transformer secondary 11, diode plates $M^3$ and the cathode $M^1$. The condenser $24^1$ has its positive terminal connected by conductor 13 to the cathode $M^1$ of the valve M and smooths out ripples in the rectified current flow through the circuit including the secondary 11, diode plates $M^3$, and cathode $M^1$ which impresses a definite constant voltage across its terminals. It will be noted that the positive terminal of the condenser $24^1$ is connected to the negative terminal of the condenser 15 and that both of these condensers, which may be considered as the equivalent of batteries in that steady direct current voltages are maintained across their terminals, are included in and form part of the plate circuit for the valve L. This circuit may be traced from the positive terminal of the condenser 15 through conductor 14 to ground, ground to the contact roller F, web A, contact roller G, resistance 18, plate to cathode resistance of the valve L, and conductor 17 to the negative terminal of the condenser $24^1$. As is hereinafter described, when a variation in the web resistance varies the potential of the plate $L^2$, and thereby unbalances the measuring system, the latter is rebalanced by a corrective variation in the potential bias of the grid $L^4$ of the valve L, whereby the potential of the plate $L^2$ is restored to its normal value.

The transformer secondary 12 has one terminal connected by a conductor 19 to the diode plates $L^3$ of the valve L, and has its other terminal connected by a conductor 20 to one terminal of a resistance 21. The latter has its second terminal connected through a portion of conductor 17, to the cathode L' of the valve L. The resistance 21 is a slide wire resistance engaged by a contact 22 movable along the resistance and connected by a conductor 23 to the control grid $L^4$ of the valve L. The secondary 12, resistance 21 and contact 22 thus form means for impressing a regulable control bias potential on the grid $L^4$. A condenser 24 connected between the conductors 17 and 20, and thereby to the opposite ends of the resistance 21, smooths out ripples in the rectified current flow through the circuit including the secondary 12, diode plates L³, cathode L', and resistance 21, whereby a substantially uniform potential drop along the length of the resistance 21 is maintained. A volt meter 25 constituting the instrument I of Fig. 1, when the device H includes the measuring system of Fig. 3, is connected between the conductors 20 and 23, and thus provides a measure of the potential bias of the grid L⁴ and of the moisture content of the web.

When a change in the resistance of the web A unbalances the measuring system, the contact 22 is automatically adjusted along the resistance 21 to rebalance the system by a connection between the contact 21 and a reversible relay motor 26, the connection, as shown diagrammatically, including the motor armature shaft 27. The motor 26 has two field windings 28 and 29, each having one terminal connected through the motor armature to a supply conductor 1, and the motor operates in one direction or the other accordingly as the second terminal of one or the other of the windings 28 and 29 is connected to the cooperating supply conductor 2. As shown, the second terminals of the windings 28 and 29 are connected to switch contacts 30 and 31, respectively. A switch arm 32 connected to the conductor 2, is movable between one position in which it engages the contact 30, and a second position in which it engages the contact 31, through a normal intermediate position in which it engages neither contact. The contact arm 32 is carried by an oscillating armature element in inductive relation with a magnetic core 33 subjected to opposing magnetizing actions of windings 34 and 35. The contact 32 is given a bias for turning movement in one direction by a spring 32', and is moved out of its neutral position into engagement with the contact 31, or into engagement with the contact 30, accordingly as the current flow through the winding 34 rises above or falls below the normal value required to hold the contact arm 32 in its normal intermediate position.

As shown, the winding 34 is connected in series with a resistance 36 between the plate M² of the valve M and ground. The current flow through the conductor 34 is thus the plate current of the valve M, which is created by the potential difference between the rectifier output conductors 13 and 14 and is of a magnitude controlled by the bias potential of the grid M⁴ of the valve M. The grid M⁴ is connected by a conductor 37 to the plate circuit of the valve L, at a control point 38 in the latter. Preferably, and as shown, the control point 38 is between the resistance 18 and the plate L², and hence is at the same potential as the latter. The bias potential of the grid M⁴, and current flow through the winding 34, are thus dependent upon the sum of the potential drops in the web resistance and in resistance 18. The winding 35 is connected in series with a resistance 39 between the negative rectifier output conductor 13 and ground, so that the current flow through the winding 35 is not affected by variations in the web resistance. The secondary 11 is the source of the bias potential impressed on the grid M⁴, and its use avoids the bias voltage fluctuation which would occur if the bias voltage were furnished by the rectifier N only and the capacity of the latter were not great enough to avoid rectifier overloads.

With the apparatus shown in Fig. 3, for each web resistance value, there will be a certain position of the contact 22 along the resistance 21, resulting in an aggregate potential drop through the web and resistance 18, of a predetermined normal value. When the contact is in that position the measuring system is in its balanced condition in which the common potential of the control point 38 and grid M⁴, is that required for a plate current flow through the valve M of such magnitude that the winding 34 will hold the contact arm 32 in its intermediate position.

On a decrease in the moisture content and consequent increase in the resistance of the web, the current flow through the valve L plate circuit, including the resistance 18 and the web resistance, is decreased. While this decrease in its plate current increases the plate to cathode resistance of the valve L, the increase in that resistance is not quite as great proportionally as the web resistance increase which produced the plate current reduction. The increase in the web resistance thus makes the grid M⁴ more negative, and thereby decreases the plate current flow through the valve M, so that the contact arm 32 moves into engagement with the contact 30.

The resultant operation of the motor 26 is in the direction to lower the contact 22, as seen in Fig. 3, and make the control grid L⁴ more negative relative to the cathode L', thereby increasing the plate to cathode resistance of the tube L. The operation of the motor 26 continues until the adjustment of contact 22 increases the plate to cathode resistance of the tube L sufficiently to rebalance the measuring system by restoring the normal potential drop between ground and the control point 38 in the plate circuit of the valve L. When that normal potential drop is reestablished, the potential of the control grid M¹ of the valve M is restored to its normal value, and the contact arm 32 moves into its intermediate position, deenergizing the motor 26. Operations which are the converse of those just described, occur when the measuring system is unbalanced by an increase in the moisture content and corresponding decrease in the web resistance.

As will be apparent, the position of the contact 22 along the resistance 21 provides a measure of the moisture content of the web. Furthermore, that measure is a linear measure, notwithstanding the logarithmic relation of the web moisture content and electrical conductivity, because of the logarithmic relation of the rebalancing grid bias change in the valve L to the change in the potential drop in the valve L produced by a change in the web resistance and the corresponding rebalancing adjustment of the grid bias potential. The two logarithmic functions are sufficiently similar, so that a linear relation between the web moisture content and the position of the contact along the slide wire resistance 21 may be secured by the selection of suitable measuring system constants. For this purpose and also to protect the measuring system against injury in case of the actual grounding of the contact roll G, or an abnormal reduction in the web resistance, the resistance 18 should be large, of the order of several megohms. While the measuring system constants need not be related to give any particular value to the normal value of the aggregate potential drop in the portion of the plate circuit of the valve L, or the hereinafter described valves LA, including the web and the resistance 18, in practice that potential drop may well be of the order of 300 volts.

The measuring system shown diagrammatically in Fig. 4 differs from that shown in Fig. 3, primarily in that it includes a pentode tube LA, in lieu of the triode tube L of Fig. 3, whereby an increased range of moisture content variation can be accurately measured. In Fig. 4, the power unit secondary 12 of Fig. 3 is omitted, the cathode L' of the valve LA is connected to the contact 22 movable along the resistance 21, the lower end of that resistance is connected to the negative rectifier output conductor 13, and the condenser 24 is connected between the conductor 13 and the conductor 17. A constant potential difference, produced by the rectification of the voltage of the secondary 11, is thus maintained between the terminals of the resistance 21. The upper end of the resistance 21 and the corresponding terminal of the secondary 11 are connected to the control grid $L^4$ of the valve LA of Fig. 4. While the adjustment of the contact 22 does not directly effect the absolute potential of the grid $L^4$, and its adjustment varies the potential bias relation of the grid to the cathode L' as in Fig. 3.

Fig. 4 also omits the control parts 32, 35 and 39 of Fig. 3. In Fig. 4, however, the plate of the valve M is connected to ground as in Fig. 3 except that in Fig. 4 the inductive winding 34 of Fig. 3, is replaced by a resistance 34'. A galvanometer 25' is connected in a deflectional type potentiometric circuit including a resistance 40, and a battery 41, connected to the terminals of the resistance 40, and having its negative terminal connected to the negative end of the resistance 36. One terminal of the galvanometer 25' is connected to ground, and the other terminal is connected to the resistance 40 at a point 42 thereof, which may be varied for calibration purposes. The galvanometer 25', the contact 22, and resistance 21 of Fig. 4, may all be included in an instrument I of the "Brown potentiometer" controller type, in which the potentiometer relay mechanism adjusts the contact 22 along the resistance 21 in response to deflections of the galvanometer 25', as required to so rebalance the measuring system of Fig. 4 that the current flow through the resistance 36 will be that existing with the normal potential value of the control point 38 and $M^2$ of Fig. 4.

The total resistance of the slide wire resistor 21 of Fig. 4 should be high enough to avoid overloading of the diode plates, and the range of movement of the contact 22 may be confined to a sectional portion only of the length of the resistance 21, so as to insure the proper range of variation in the bias potential of the control grid $L^4$ of the valve LA. The Brown potentiometer controller instrument used in conjunction with the measuring system shown in Fig. 4, may include the control switches IA and IB of Fig. 2.

Fig. 5 illustrates a modification of the apparatus shown in Fig. 3, in which the valve L of Fig. 3 is replaced by a pentode tube LA, and in which the potential difference between the cathode L' and grid $L^4$ of the valve LA is not due to the action of a power unit secondary, but to a battery 43. The latter is connected to the ends of a slide wire resistance 44 engaged by the movable contact 22 connected to the grid $L^4$ of the valve LA. One end of the resistance 44 is connected by a conductor 45 to the cathode L' of the valve LA. In Fig. 5 use is made of a galvanometer 25', a resistance 40 and a battery 41, associated with the resistance 36 in the plate circuit of the valve M as in Fig. 4.

Fig. 6 illustrates a modification of the apparatus shown in Fig. 4, with which it is possible to obtain a compensation for line voltage variations not obtainable with the circuit arrangements shown in Figs. 3, 4, and 5. In each of those circuit arrangements a line voltage variation varies the plate current of the valve M in much the same manner as that current is varied by variation in the moisture content of the web. While in each arrangement, an increase or decrease in the line voltage tends directly to increase or decrease the plate current in each of the two thermionic valves of each arrangement, the effect of the line voltage variation important herein, is the effect on the bias potential of the control grids of the valves.

With the arrangement shown in Fig. 4, an increase in the line voltage correspondingly increases the voltage impressed on the terminals of the resistance 21, thus making the grid $L^4$ of the valve LA more negative relative to the cathode L' of the valve LA. This increases the resistance of the valve LA, and makes its plate $L^2$ and plate circuit control point 38 more positive. The resultant potential change in the positive direction of the grid $M^4$ of the valve M decreases the resistance of, and thereby increases the current flow through, the plate circuit of the valve M. The galvanometer 25' then acts to effect an adjustment of the contact 22 in the direction in which the contact would be adjusted as a result of a decrease in the web resistance. With the arrangement of Fig. 4 therefore, the effect of an increase or decrease from a normal value of the line voltage is to make the resistance of the web appear to be lower or higher respectively, than it actually is. With the apparatus of Fig. 3, a similar error in the measurement of the web resistance results from an increase or decrease in the line voltage of the arrangement shown in Fig. 3.

In the arrangement of Fig. 5, wherein the bias to the grid $L^4$ of the valve LA is maintained constant by the battery 43, an increase in the line voltage increases the potential difference between the conductors 16 and 17 and thereby makes the cathode L' more negative relative to the cathode M'. Furthermore an increase in potential appears between the conductors 13 and 14 which results in an increased current flow through the circuit including the web resistance, resistance 18 and the plate to cathode resistance of the tube LA. In consequence, the potential of the control point 38 is made more negative and the plate to cathode resistance of the valve M is increased. The effect in Fig. 5 of an increase or decrease in the line voltage from a normal value, is thus to make the resistance of the web appear to be larger or smaller respectively, than its actual value.

The arrangement shown in Fig. 6 is precisely like that shown in Fig. 4, except that in Fig. 6, the resistance 21 is connected to the rectifier negative output conductor 13 by a resistance 21', and a shunt including a neon tube 46 and a resistance 47 in series with said tube, is connected to the terminals of the resistance 21. With the arrangement shown in Fig. 6, an increase in the line voltage increases the voltage between the conductors 16 and 17, as in Fig. 4, but does not proportionally increase the voltage drop in the resistance 21, because of the action of the shunt including the tube 46. Provided the voltage impressed on the tube 46 is sufficient to keep the latter discharging, the potential drop in the tube will remain practically constant notwithstanding line voltage fluctuations. In consequence, when an increase in the line voltage increases the sum of the potential drops in the resistances 21 and 21', the ratio of the current flow through the resistance 21, to the current flow through the shunt including the resistance 47 is decreased, and the potential drop in the resistance 21 is thus less than it would be if the shunt were not provided.

Theoretically, different relative values of the resistances 21, 21' and 47 are required to compensate exactly for each particular line voltage variation. In practice, however, with said resistances suitably proportioned, the line voltage may vary as much as 10% in either direction from an intermediate normal value for which the apparatus is designed and calibrated, without resulting in significant errors in the resistance measurements.

While the arrangement shown in Fig. 6 possesses an advantage over the arrangements of Figs. 3, 4, and 5, in respect to the effects of line voltage variations, with the arrangement shown in Fig. 6, the balancing movements of the contact 22 along the resistance 21 are not in linear proportion to the change in web moisture content throughout the full range of contact adjustment. With the apparatus calibrated to secure the proper proportionality when the contact 22 is at or adjacent the center of its range of adjustment, there will be some error when the contact 22 approaches either end of its range of adjustment.

In Fig. 6, the sensitivity of the galvanometer 25' may be varied by adjusting the point 42' along the resistance 36 at which the point 42 of the resistance 40 is connected. When the web resistance is at the desired value, the contact 42 will be at a position on the potentiometer resistance 40 corresponding to the adjustment of the point 42' along the resistance 46. With the point 42' at the left hand end of the resistance 36 as seen in Fig. 6, the maximum possible deflection for any particular variation in moisture which may occur will be produced. If the point 42' is at an intermediate point along the resistance 36, the meter deflection for each moisture content variation will be correspondingly reduced.

In the modification illustrated in Fig. 7, the resistance of the web to be measured is connected in one arm, and a valve LA is connected in the second arm, of a Wheatstone bridge, the other two arms of which include resistances 48 and 49, respectively. The bridge arms including the resistance to be measured and the plate and cathode of the valve LA, are connected in series, as are the bridge arms including the resistances 48 and 49, between the energization junctions 50 and 51 of the bridge. The junction 50 is connected to the positive rectifier output conductor 14, and the junction 51 is connected to the negative output conductor 13 through the resistance 21. The movable contact 22 is connected through a battery 54 to the control grid $L^4$ of the valve LA. In Fig. 7, the valve M has its cathode connected to the bridge junction 53 intermediate the resistances 48 and 49, and the control grid $M^4$ of the valve M is connected to the junction 52 intermediate the valve LA and the resistances 18 and web resistance, the junction 52 thus being the control point in the plate circuit of the valve LA, determining the bias potential of the grid $M^4$. The plate $M^2$ of the valve M is connected to the junction 50, and thereby to the conductor 14, through resistances 34' and 36.

With the arrangement shown in Fig. 7, the bias voltage for the control grid $L^4$ of the valve LA is thus provided by a voltage divider formed by the resistances 48, 49, and 21. The portion of the plate circuit of tube M between bridge junctions 50 and 53 is in shunt to the resistance 48. Its effect on the voltage divider action of the resistances 48, 49 and 50 is practically negligible because the plate current through the tube is small, and also because it is practically constant at all times at which the measuring system is balanced.

With a suitably selected voltage for the battery 54, the constant potential effect of the latter will operate in the Fig. 7 arrangement, as does the constant potential action of the neon tube 46 in the arrangement of Fig. 6, to make the resistance measurements independent of line voltage variations throughout a considerable range of such variations.

Fig. 8 illustrates a modification of the apparatus shown in Fig. 7, in respect to the arrangement of the galvanometer 25'. In Fig. 8, the galvanometer 25' has one terminal connected to the resistance 36, as in Figs. 6 and 7, but has its second terminal connected to the voltage divider resistance 48 at a suitable point 55 along the length of that resistance, so that the battery 41 is not required in Fig. 8. With the arrangement shown in Fig. 8, a rapid variation in the line voltage will result in a change in the deflection of the galvanometer 25', but normally, the fluctuations in the resistance of the traveling web are much greater than the fluctuations in line voltage, and with the voltage 54 of Fig. 8 such as is required to compensate for a line voltage variation of 10% above or below the normal voltage, the measurements of the moisture content A of the web will be free from errors of significant practical importance.

For most purposes I prefer the arrangement shown in Fig. 8 to those shown in the other figures hereof. The circuit arrangement of Fig. 8 is especially advantageous because of the capacity of the arrangement to cover a wide range of web moisture and resistance variation, as great as is practically necessary, without requiring any change in the resistors used, or other attention from the operator; and because of the avoidance of such calibrations, as are frequently necessary to compensate for variations in the voltage of a battery used in a potentiometer circuit arrangement, as is the battery 41 shown in Figs. 4, 5, 6, and 7; and because the measuring circuit has approximately the same sensitivity over the entire range of its logarithmic response to variations in web moisture.

Fig. 9 illustrates a modification of the arrangement shown in Fig. 7, in which the galvanometer 25' and related potentiometer relay mechanism, are replaced by a reversible electric motor 56, having an operating connection 56' between its armature shaft and the contact 22, for adjustment of the latter when the motor is operated. The motor 56 is an induction motor, having two windings 57 and 58, and operates in one direction or the other, or remains stationary, accordingly as it is selectively energized.

While in accordance with the provisions of the statutes, I have illustrated and described the best forms of embodiment of my invention now known to me. It will be apparent to those skilled in the art, however, that changes may be made in said forms of embodiment, without departing from the spirit of my invention as set forth in the appended claims, and that certain features of my invention may be used with advantage in some cases, without a corresponding use of other features.

Having now described my invention, what I claim as new and desire to secure by Letters Patent, is:

1. In measuring a resistance, the method which consists in passing the plate current of a thermionic tube through said resistance, varying the grid bias potential of said tube as required to create a predetermined ratio between the potential drop in said tube and in said resistance, and measuring said grid bias potential.

2. The method of determining the moisture content of material which consists in passing the plate current of a thermionic tube through said material, subjecting said tube to the grid bias potential required to maintain a potential drop of predetermined magnitude in a portion of the plate circuit of said tube including said resistance, and measuring said bias potential.

3. In resistance measuring means, the combination with a thermionic tube, of a variable resistance to be measured, a second resistance and a source of current connected in the plate circuit of said tube, and means responsive to variations in the potential drop in a portion of said circuit including said resistances for varying the plate to cathode resistance of said tube as required to maintain said potential drop approximately constant as said variable resistance changes in value.

4. Apparatus for determining the value of a variable in logarithmic relation with the conductivity of an element, comprising an electronic valve having an anode, a cathode and a control grid, a source of current, means including said anode, cathode, element and source in the plate circuit of said valve, whereby on a change in the current carrying capacity of said element the plate resistance of said valve will vary and thereby minimize the potential drop change in a portion of the plate circuit including said element produced by the first mentioned change, means responsive to said potential drop for varying the bias potential of said grid as required to restore said potential drop to a predetermined value, and means for measuring said bias potential.

5. In apparatus for measuring the moisture content of a moving web, a Wheatstone bridge having one arm comprising two parallel branches, a galvanometer connected across said branches, and means for varying the flow of electric current through one of said branches in accordance with variation in moisture content of the web to produce deflections of said galvanometer.

6. In apparatus for measuring the moisture content of a moving web, an electronic valve including a cathode, an anode and a control grid, means for passing an electric current through the web, and means responsive to the magnitude of said electric current for subjecting said control grid to a bias potential varying as required to maintain the plate to cathode resistance of said tube proportional to the electrical resistance of said web.

7. In apparatus for measuring the moisture content of a moving web, a Wheatstone bridge including a portion of the web in one arm thereof, an electronic valve having its cathode and plate connected in another arm thereof, and having a control grid, a bridge energizing source of direct current voltage, a second electronic valve having a cathode, plate and control grid and having its cathode and grid connected to the balancing junctions of said bridge, and having its plate connected to one of the other bridge junctions, and means responsive to the plate current flow in the second mentioned valve for varying the plate to cathode resistance of the first mentioned valve in accordance with variations in the moisture content of the web.

8. In apparatus for measuring the magnitude of a variable resistance, an electrical bridge circuit including said variable resistance in one arm thereof, an energizing source of electric current for said bridge, the said bridge being adapted to be balanced when the electric potential across the arm including said variable resistance is a predetermined value, means for restoring said predetermined potential on a change therein resulting from a variation in resistance of said variable resistance including means connected in an opposing arm of said bridge variable in electric resistance in accordance with the flow of electric current therethrough, and linearly varying means for varying said potential substantially in accordance with the difference between the potential variation caused by the variation of the variable resistance and the second mentioned means.

9. In apparatus for measuring the magnitude of a variable resistance, an electrical bridge circuit including said variable resistance in one arm thereof, an energizing source of electric current for said bridge, the said bridge being adapted to be balanced when the electric potential across the arm including said variable resistance is a predetermined value, means for restoring said predetermined potential on a change therein resulting from a variation in resistance of said variable resistance including means connected in an opposing arm of said bridge variable in electric resistance in accordance with the flow of electric current therethrough, and tending to maintain the electric potential across said first arm at said predetermined value.

10. In an electrical circuit for measuring the magnitude of a variable resistance, a bridge including said variable resistance in one arm, a source of electrical current for said bridge, means connected in an opposing arm of said bridge adapted to be varied in electrical resistance in accordance with variations in said electrical current produced by variations in said variable resistance, and means continuously connected in said bridge to vary the electrical resistance of said first mentioned means, said first mentioned means comprising an electronic valve.

11. An apparatus for measuring the magnitude of a variable, an electronic valve including a cathode, an anode, and a grid, a load connected in circuit with said anode and cathode, the said load including said variable and also including a non-variable constituent and adapted upon variation in said variable to vary the flow of current conducted by said electronic valve for varying the electric resistance between the cathode and anode of said electronic valve.

12. Apparatus for measuring a variable quantity including an electronic valve having an anode, cathode and a control grid adapted to receive anode voltage and grid bias voltage from a direct current source of supply voltage wherein changes in the voltage of said source affect the anode and grid bias voltages to said valve, means including a gaseous discharge tube adapted upon such change in voltage of said source to vary said grid bias voltage as required to maintain the plate to cathode resistance of said valve substantially constant.

13. Apparatus for measuring a variable quantity including an electronic valve having an anode, cathode and a control grid adapted to receive anode voltage and grid bias voltage from a direct current source of supply voltage wherein changes in the voltage of said source affect the anode and grid bias voltages to said valve, means adapted upon such change in voltage of said source to vary said grid bias voltage as required to maintain the plate to cathode resistance of said valve substantially constant, said means including a bias resistor having a suitable portion thereof connected between the grid and cathode of said valve, a gaseous discharge tube and a suitable resistor in series therewith connected in shunt with said bias resistor, a suitable resistor connected in series with the parallel arrangement, and the series-parallel arrangement connected between the terminals of said supply source.

14. Apparatus for measuring a variable quantity including an electronic valve having an anode, cathode, and a control grid adapted to receive anode voltage and grid bias voltage from individual direct current sources of supply voltage wherein proportional changes in the voltage of said sources affect the anode and grid bias voltages to said valve, means adapted upon such proportional changes in voltage of said sources to vary said grid bias voltage as required to maintain the plate to cathode resistance of said valve substantially constant.

15. Apparatus for measuring a variable quantity including an electronic valve having an anode, cathode, and a control grid adapted to receive anode voltage and grid bias voltage from individual direct current sources of supply voltage wherein proportional changes in the voltage of said sources affect the anode and grid bias voltages to said valve, means adapted upon such proportional changes in voltage of said sources to vary said grid bias voltage as required to maintain the plate to cathode resistance of said valve substantially constant, said means including a bias resistor having a suitable portion thereof connected between the grid and cathode of said valve, a gaseous discharge tube and a suitable resistor in series therewith connected in shunt with said bias resistor, a suitable resistor connected in series with the parallel arrangement, and the series-parallel arrangement connected between the terminals of one of said supply sources.

16. In apparatus for measuring the electrical conductivity of a body, a Wheatstone bridge, electronic valve means connected in said bridge, a source of direct current energizing voltage connected to said bridge, means for producing a difference in voltage between the balancing junctions of said bridge proportional to a variation in the electrical conductivity of said body, and means continuously connected in said bridge and set into operation by said voltage difference to reduce said voltage difference, said last-mentioned means including means to vary the electrical conductivity of said electronic valve means.

17. Apparatus for measuring the moisture content of a moving web including in combination, an electrical circuit including the resistance of at least a portion of said web therein and having a pair of terminals the potentials of which are normally substantially the same but the potentials of which are adapted to be relatively varied in accordance with the variations of said web resistance from a predetermined value, an electronic discharge device having an input circuit and an output circuit, a connection between the input circuit of said electronic discharge device and said terminals of said circuit, a current responsive device connected to the output circuit of said electronic discharge device and having a member deflecting in one direction or the other responsively to variations in said web resistance, and means responsive to the deflections of said member for reducing said deflections.

18. Apparatus for measuring the moisture content of a moving web including in combination, an electrical circuit including the resistance of at least a portion of said web therein and having a pair of terminals the potentials of which are normally substantially the same but the potentials of which are adapted to be relatively varied in accordance with the variations of said web resistance from a predetermined value, an electronic discharge device having an input circuit and an output circuit, a connection between the input circuit of said electronic discharge device and said terminals of said circuit, a device connected to the output circuit of said electronic discharge device, and means controlled by said device to restore the potentials of said terminals of said circuit to substantially the same value upon deviation therefrom.

19. Apparatus for measuring the moisture content of a moving web the electrical resistance of which varies at least hundreds of megohms over the range of moisture content to be measured including in combination, a normally balanced electrical circuit including the resistance of at least a portion of said web therein and adapted to be unbalanced in one direction or the other in accordance with changes in said web resistance, said circuit having a pair of terminals the potentials of which are normally substantially the same when said circuit is balanced but the potentials of which are adapted to be relatively varied when said circuit is unbalanced, an electronic discharge device having an input circuit and an output circuit, a connection between the input circuit of said electronic discharge device and said terminals of said circuit, a device connected to the output circuit of said electronic discharge device, and means controlled by said device to rebalance said circuit on unbalance thereof.

HUBERT T. SPARROW.